(12) United States Patent  
Roberts et al.

(10) Patent No.: US 10,258,091 B2  
(45) Date of Patent: Apr. 16, 2019

(54) STRUCTURE TO ABSORB, DISSIPATE AND MEASURE A FORCE

(71) Applicant: IMPACT TECH LABS LIMITED, Twickenham, Middlesex (GB)

(72) Inventors: Jason Lloyd Roberts, St. Margaret's (GB); Wilhelm Marschall, London (GB); Haim Geva, London (GB); Kemal Dervish, Welwyn Garden (GB)

(73) Assignee: NURVV LIMITED, Twickenham (GB)

( * ) Notice: Subject to any disclaimer, the term of this patent is extended or adjusted under 35 U.S.C. 154(b) by 314 days.

(21) Appl. No.: 15/053,657

(22) Filed: Feb. 25, 2016

(65) Prior Publication Data

US 2017/0127734 A1 May 11, 2017

(30) Foreign Application Priority Data

Nov. 5, 2015 (GB) .................................. 1519575.3

(51) Int. Cl.
*B32B 27/00* (2006.01)
*A41D 1/00* (2018.01)
(Continued)

(52) U.S. Cl.
CPC ............. *A41D 1/002* (2013.01); *A41D 1/005* (2013.01); *A41D 13/0015* (2013.01);
(Continued)

(58) Field of Classification Search
CPC .... A41D 1/002; A41D 1/005; A41D 13/0015; A41D 13/015; A41D 31/0016; A41D 31/005; B32B 7/02; B32B 2307/536
(Continued)

(56) References Cited

U.S. PATENT DOCUMENTS 7,734,393 B2 * 6/2010 Murakami .......... B60R 21/0136
293/120
8,113,494 B2 * 2/2012 Sunder ................. G11B 19/043
267/136
(Continued)

FOREIGN PATENT DOCUMENTS

| CN | 2540630 Y | 3/2003 |
| CN | 103048068 A | 4/2013 |
| CN | 204275461 U | 4/2015 |
| CN | 204709754 U | 10/2015 |
| CN | 204709755 U | 10/2015 |
| WO | 0048692 A1 | 8/2000 |

OTHER PUBLICATIONS

Intellectual Property Office (United Kingdom), Search Report issued in corresponding GB Application No. 1519575.3, dated Mar. 31, 2016.

*Primary Examiner* — Max H Noori

(74) *Attorney, Agent, or Firm* — Stites & Harbison, PLLC; Jeffrey A. Haeberlin

(57) ABSTRACT

A structure to absorb, dissipate and measure a force includes a plurality of distinct layers. The layers include a first impact absorbing material having an outer face facing the direction of expected impact and an opposite inner face, an impact dissipating layer adjacent to the inner face of the first impact absorbing material and having a higher flexural rigidity than the first impact absorbing material, a second impact absorbing material having an outer face adjacent to the impact dissipating layer and an opposite inner face, and having a lower hardness than the impact dissipating layer, and a pressure sensor arranged across the inner face of the second impact absorbing material. An impact on the outer face is partially absorbed by that material, dissipated by the impact dissipating layer and further absorbed by the second impact absorbing material, with the remaining transmitted force being sensed by the pressure sensor.

8 Claims, 8 Drawing Sheets

(51) Int. Cl.

| | | |
|---|---|---|
| *A41D 13/015* | (2006.01) | |
| *A41D 31/00* | (2019.01) | |
| *B32B 7/02* | (2019.01) | |
| *A41D 13/00* | (2006.01) | |
| *B32B 5/18* | (2006.01) | |
| *B32B 5/24* | (2006.01) | |
| *B32B 27/06* | (2006.01) | |
| *B32B 27/34* | (2006.01) | |
| *B32B 27/36* | (2006.01) | |
| *B32B 3/08* | (2006.01) | |

(52) U.S. Cl.
CPC ......... *A41D 13/015* (2013.01); *A41D 31/005* (2013.01); *A41D 31/0016* (2013.01); *B32B 3/08* (2013.01); *B32B 5/18* (2013.01); *B32B 5/245* (2013.01); *B32B 7/02* (2013.01); *B32B 27/065* (2013.01); *B32B 27/34* (2013.01); *B32B 27/365* (2013.01); *B32B 2250/40* (2013.01); *B32B 2250/44* (2013.01); *B32B 2262/101* (2013.01); *B32B 2262/106* (2013.01); *B32B 2266/0292* (2013.01); *B32B 2274/00* (2013.01); *B32B 2307/518* (2013.01); *B32B 2307/536* (2013.01); *B32B 2307/546* (2013.01); *B32B 2307/56* (2013.01); *B32B 2571/00* (2013.01)

(58) Field of Classification Search
USPC ....................................................... 73/12.09
See application file for complete search history.

(56) References Cited

U.S. PATENT DOCUMENTS

| | | | |
|---|---|---|---|
| 8,938,817 B1 * | 1/2015 | Baldi | A42B 3/069 |
| | | | 2/411 |
| 2002/0060633 A1 | 5/2002 | Crisco, III et al. | |
| 2006/0254369 A1 | 11/2006 | Yoon et al. | |
| 2007/0021269 A1 | 1/2007 | Shum | |
| 2008/0307899 A1 | 12/2008 | Von Lilienfeld-Toal et al. | |
| 2009/0293587 A1 | 12/2009 | Mages | |
| 2010/0162832 A1 | 7/2010 | Brauers | |
| 2011/0282164 A1 | 11/2011 | Yang et al. | |
| 2012/0143526 A1 | 6/2012 | Benzel et al. | |
| 2012/0210498 A1 | 8/2012 | Mack | |
| 2012/0323501 A1 | 12/2012 | Sarrafzadeh et al. | |
| 2013/0077263 A1 | 3/2013 | Oleson et al. | |
| 2013/0110415 A1 | 5/2013 | Davis et al. | |
| 2013/0167663 A1 | 7/2013 | Eventoff | |
| 2013/0192071 A1 | 8/2013 | Esposito | |
| 2013/0312152 A1 | 11/2013 | Paul et al. | |
| 2014/0083207 A1 | 3/2014 | Eventoff | |
| 2014/0088454 A1 | 3/2014 | Mack | |
| 2014/0101831 A1 | 4/2014 | Balzano | |
| 2014/0303529 A1 | 10/2014 | Park et al. | |
| 2014/0333446 A1 | 11/2014 | Newlove | |
| 2015/0059494 A1 | 3/2015 | Stanzione | |
| 2015/0190052 A1 | 7/2015 | Vaitaitis | |
| 2015/0282759 A1 | 10/2015 | Lin et al. | |
| 2015/0297973 A1 | 10/2015 | Beers | |

* cited by examiner

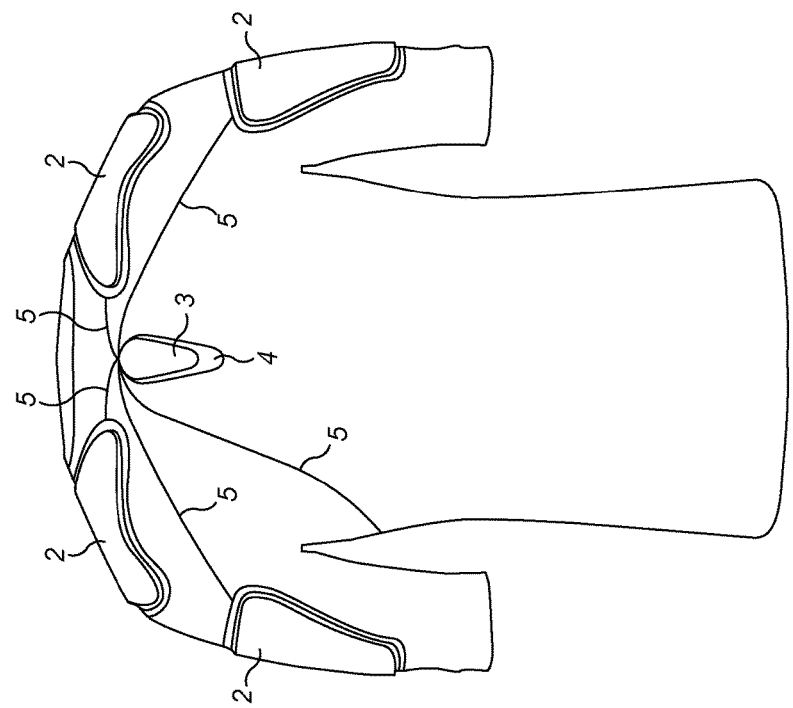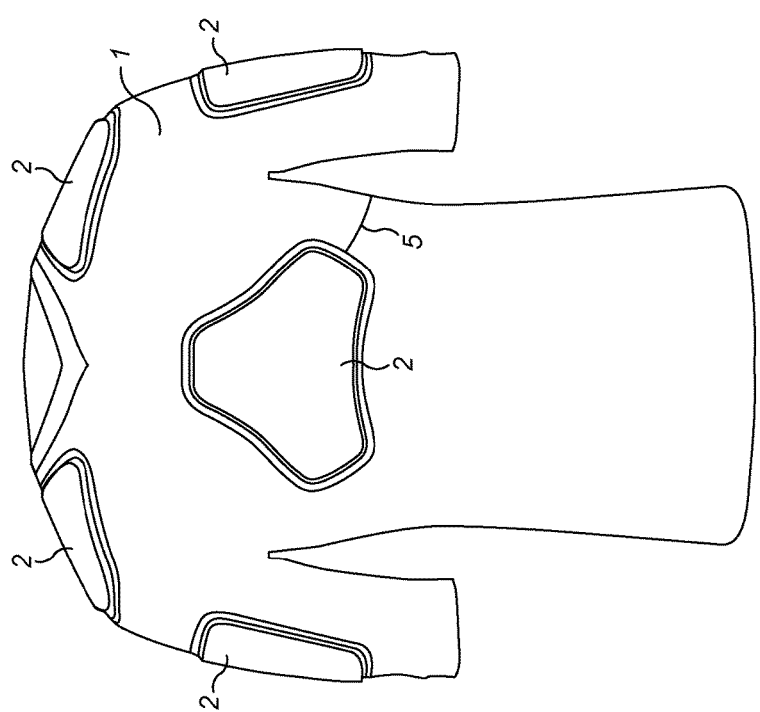

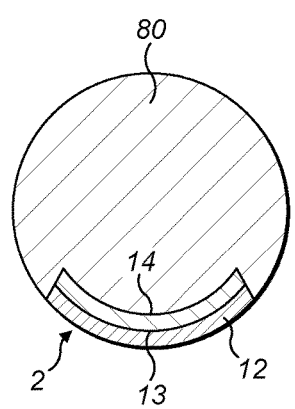
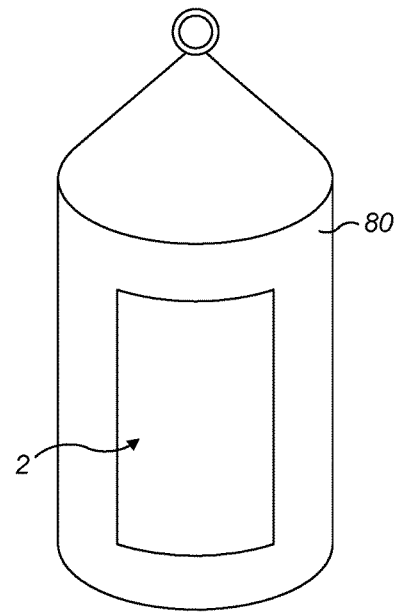
FIG. 6A            FIG. 6B
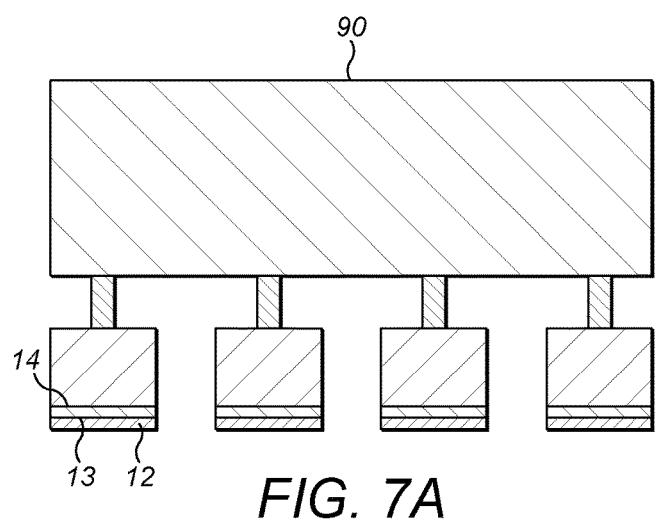
FIG. 7A

STRUCTURE TO ABSORB, DISSIPATE AND MEASURE A FORCE

BACKGROUND OF THE INVENTION

1. Field of the Invention

The present invention relates to a structure to absorb, dissipate and measure a force.

Such a structure is primarily intended to be part of a wearable garment. However, it has other applications such as sporting equipment where it might be required to absorb, dissipate and measure a force. For example, in a scrummaging machine or tackle bag. The structure may also have applications, for example, in crash barriers and in the protection of vehicles during transport. It may be used to protect both a tool and a work piece where it would be helpful to measure the force to determine whether the tool needs to be recalibrated or serviced.

2. Description of Related Art

Wearable garments with impact absorbing pads are known in numerous applications. In particular, they are widely used in sports where the wearer's body is likely to be subjected to an impact. For example, in rugby, football (US), boxing, horse riding and cricket. In addition, in activities such as motorcycling and cycling, impact absorbing pads are built into helmets, jackets and trousers which provide a degree of protection to the body of a user.

Also of relevance to the present invention are a number of developments in the field of "smart clothing". Examples of smart clothing include pedometers, gyroscopes and heart rate monitors built into garments. These are generally used to measure parameters such as distance travelled, speed, acceleration and heart rate. These can be used to provide an indication to a user of various parameters such as energy expended, distance travelled etc.

Of particular relevance to the present invention are developments in smart clothing in the field of impact detection. The applicant is aware of a number of systems which are designed to indirectly measure the impact on a body. These include the xPatch manufactured by X2 Biosystems. This is a patch which is designed to be taped behind the ear of a user and provides six axis acceleration measurements. The Checklight manufactured by Reebok includes an accelerometer and a gyroscope built into a skull cap. The skull cap has red, yellow and green lights which are lit depending upon the severity of the detected impact. The Shockbox from i1 provides a similar device. Also, the blast gauge system manufactured by Blackbox Biometrix is a sensor system which monitors pressure and acceleration to determine exposure to explosive blasts in a military context.

We are also aware of a golfing glove known as the Sensoglove® which has inbuilt pressure sensors to provide an analytic tool for a trainer in determining how hard a user is gripping a club.

US 2015/0059494 discloses a system for monitoring and measuring impact forces imparted to an individual. This has a multi-layer plate which might be incorporated into an item of clothing. A sensor is provided towards the outer face of the plate.

BRIEF SUMMARY OF THE INVENTION

The present invention is aimed at providing an improvement of the above devices.

According to the present invention, there is provided a structure as defined in claim 1.

In US 2015/0059494, there is an outer textile layer followed by an epoxy and a composite laminated material in front of the sensors in the direction of input. In essence, this represents a textile layer and a rigid layer in front of the sensors. The present invention has three layers in front of the sensor. Two of these are impact absorbing materials and the other is a relatively rigid impact dissipating layer. The present invention provides an advantage over US 2015/0059494 in that the material provides impact absorbing properties not available from the prior art. Further, the impact dissipating layer is able to spread the force over a wider area which not only improves on the impact absorbing ability of the structure, but also facilitates the sensing as the sensor can measure a lower peak force over a wider area. If the structure is accommodated into a wearable garment, the fact that the impact dissipating layer is between two layers of impact absorbing material means that both the wearer and the person causing the impact on the wearer are protected from the effects of the impact.

The present invention only directly measures the pressure downstream of the impact absorbing pad. The structure may optionally comprise a second sensor adjacent to the outer face of the pad to directly measure the impact force. However, preferably, the structure is provided in combination with a means to calculate the impact force on the outer face of the impact absorbing pad based on the force measured at the inner face. This means may take the form of a control system which is programmed with a padding dampening factor relating to the impact absorbing capacity of the material. This factor is determined as a ratio of the amount of transmitted force to the incident force for a given force. Such a value is preferably determined by experimentation by testing of samples of the material.

In practice, the incident force on the outer face of the pad will not be normal to the surface of the pad. On the other hand, the pressure sensor is only capable of measuring the normal component of the transmitted force. In this and the subsequent description, the incident force refers to the impact force on the outer face of the pad. The transmitted force refers to the force on the opposite side of the pad.

At a first approximation, it is possible to rely only on measuring this normal component on the basis that this is the most harmful force to a wearer. Thus, a relatively high force applied at a relatively high angle of incidence (with respect to the normal direction) effectively represents a "glancing blow" to a user such that it is sufficient only to determine the normal components of this force.

Preferably, however, the structure is in combination with an accelerometer and a gyroscope to measure the changes in velocity (magnitude and direction) due to a collision. This information, coupled with the padding dampening factor referred to above allows the direction and magnitude of the incident force to be calculated by solving the equations of motion using laws of momentum and energy conservation.

The impact absorbing pad is a pad designed to provide a reasonable degree of cushioning for a user by absorbing a proportion of the applied force. The proportion of the absorbed force may vary to a small degree depending on the peak force of the impact and so the properties of the impact absorbing pad can be described based on a dampening factor at a chosen force 7 kN. Preferably, the first and second impact absorbing pads and the impact dissipating layer together have a dampening factor at 7 kN of greater than 10%, preferably greater than 50% and most preferably greater than 85%. The dampening factor is determined for a specific material by subjecting the material to a number of incident forces of different magnitudes and measuring the transmitted force on the opposite side of the material. A calibration curve is then obtained from these measurements for use in such calculations. A dampening factor at 7 kN of greater than 10%, for example, signifies that the pad will absorb 10% of the incident force.

Preferably, an inner fabric layer is provided covering the inner face of the pressure sensor to provide enhanced comfort, breathability and wicking properties at the interface with the users body.

An outer fabric layer may be provided covering the outer face of the pad. This will enhance the appearance of a garment as the pad is not exposed at the outer face of the garment. The first and second fabric layers may be multi-layered to provide enhanced comfort properties for the wearer. There may be further layers between the pad, sensor, and fabric layers.

The pressure sensor itself may be a single sensor able to measure pressure at one particular location. Such a sensor would be suitable for a garment where it is only necessary to detect the force in a relatively small region. Alternative, an array of such pads and sensors may be provided across a wider area.

However, preferably, the pressure sensor is in the form of a matrix array which is able to detect pressure changes across a substantial portion of the width of the impact absorbing pad.

The sensor may be a capacitive sensor (for example, as described in US2013167663) or a strain gauge. It is preferably a resistive sensor, such as an analogue resisting sensor constructed to translate applied force into electrical resistance.

The nature of the impact absorbing pad, particularly when it has an impact dissipating layer, is that an incident force will be spread across a relatively wide area. A matrix array sensor that will measure a force increase across the whole of such an area and an average from the sensors may be taken across this area. Alternatively, a "force profile" for the impact may be measured in which forces at individual locations are measured. In either event, the sensor will measure both the force and the area over which the force is applied allowing the pressure to be calculated.

However, preferably, the structure is in combination with a control module with an electrical connection to the pressure sensor. For larger garments, such as a top designed to be worn on the upper body, there may be a plurality of impact absorbing pads each with its own pressure sensor and each being connected to the control module.

The control module also preferably comprises a processing unit to receive the sensed data and, carry out any required calculation of the incident force and to control the transmission of data as required.

The control module also preferably comprises a transceiver which is able to transmit and receive data wirelessly. This may be any known type of wireless communication such as cellular, Bluetooth, W-Fi, sub 1 $GH_z$ radio or radio. The garment may also incorporate GPS technology to enable the location of the wearer to be determined.

The control module preferably also comprises a battery such as a lithium ceramic battery. This is particularly suited to such an application due to its safety qualities.

The control module preferably also includes an on/off switch. It may also include one or more LEDs to provide an on/off status, charging status and/or an indication of the magnitude of impact force.

The control module may also be provided with a memory in order to store a detected data. Alternatively, it may transmit this wirelessly in real time to be stored externally. The frequency with which a control device transmits the data will be determined by requirement. At one end of the scale, it can be streamed immediately. On the other end, it may simply all be stored on the control module and downloaded at a later date once a user has stopped wearing the garment. Otherwise, the data may be transmitted at regular intervals every few seconds or minutes.

The control module may be entirely encapsulated in the waterproof housing such that it can be washed together with the garment. Alternatively, the control module is removable. Similarly, the or each pressure sensor may be encapsulated or removable as necessary.

The garment to which the article may be applied may be one or more selected from the group containing a T-shirt, long sleeve top, jacket, harness, helmet, leggings, shorts, gloves (e.g. boxing gloves or cricket gloves), or an individual padding item attachable to the body, such as a thigh pad, chest guard, shin guard, cricket pads and neck brace. The garment may be a "skeleton" type garment which does not necessarily form a complete garment but is designed to be worn under another garment.

BRIEF DESCRIPTION OF THE DRAWINGS

An example of a structure in accordance with the present invention will now be described with reference to the accompanying drawings, in which:

FIG. 1A is a front view of a garment in a structure according to the present invention;

FIG. 1B is a back view of the garment of FIG. 1A;

FIG. 6A is a cross-section through a tackle bag incorporating a structure according to the present invention;

FIG. 6B is a plan view of the bag of FIG. 6A;

FIG. 7A is a cross-section through a scrummaging machine incorporating a structure according to the present invention;

DETAILED DESCRIPTION OF EXEMPLARY EMBODIMENTS OF THE INVENTION

FIGS. 1A to D show a padded top which is a type of padded underlayer intended for use by a rugby player. As described elsewhere in this application, the invention is applicable to wearable garments in general and other items where impact protection is required. Whilst the top illustrated in FIGS. 1A to D is being used as an illustration, it will be readily understood that, for other such garments, the impact absorbing pads are placed in the areas most likely to receive an impact.

Figure 1C:
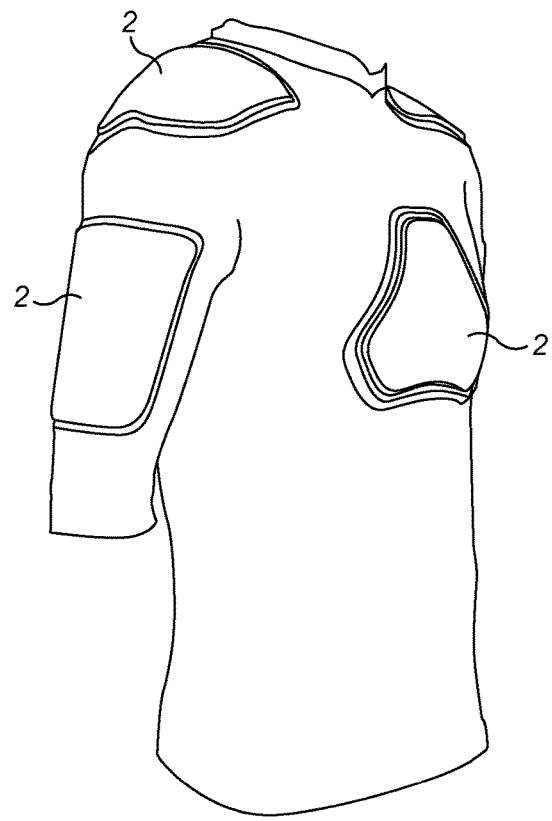
FIG. 1C is a perspective view of the garment of FIGS. 1A and B.
Figure 1D:
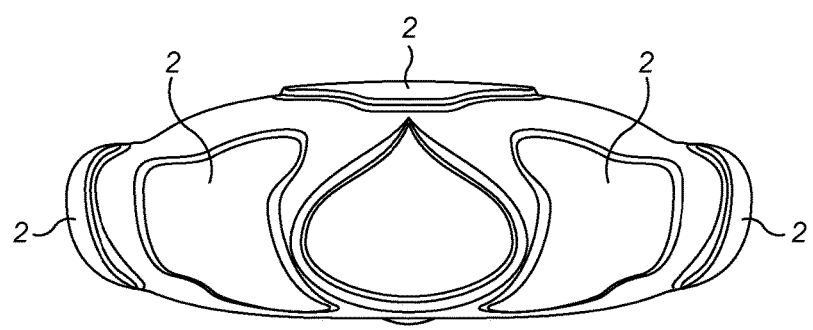
FIG. 1D is a top view of the garment of the previous figures.

As shown in FIGS. 1A to C, the garment 1 comprises five impact absorbing pads 2 comprising a pair of shoulder pads, a pair of upper arm pads and a chest pad. Towards the upper part of the back of the garment 1 is a control module 3. This is surrounded by a soft layer 4 to provide comfort for the person wearing the garment as well as anyone impacting on them. The control module 3 is connected via an electrically conductive line 5 to each of the pads 2. The line 5 may simply be a wire which is retained between layers of the garment so that it does not impede the wearer.

The number and positioning of pads is provided as one example only. There may be fewer pads, for example just the shoulder pads, or additional pads, such as pads which protect the ribs.

Figure 2:
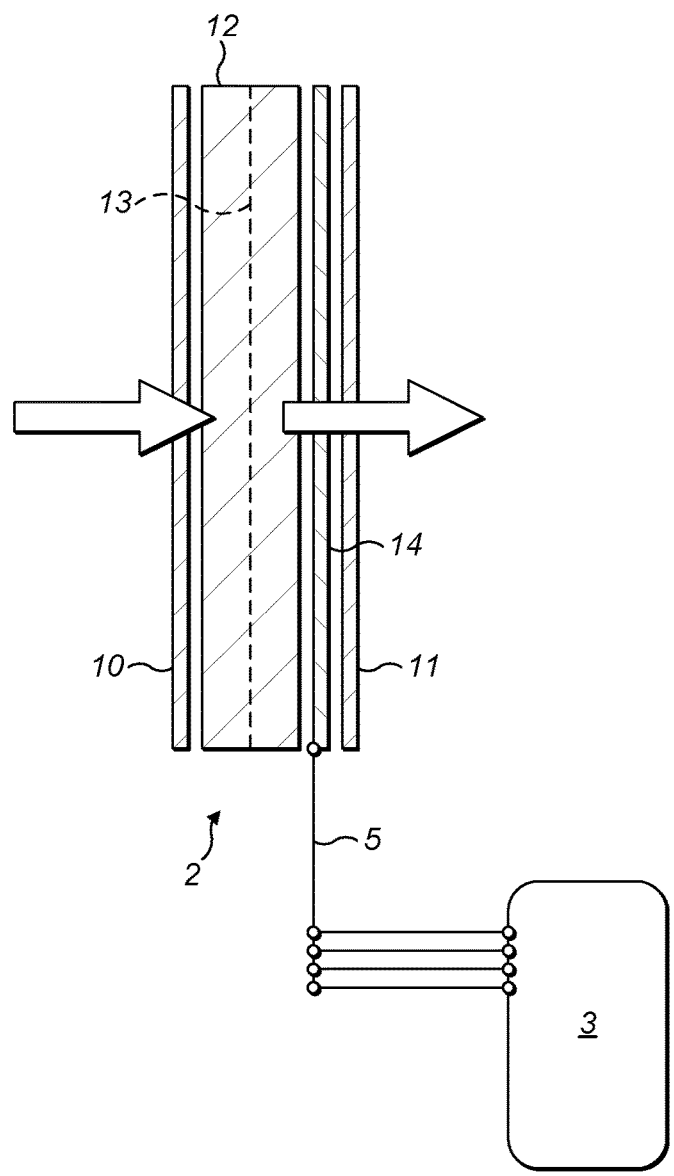
FIG. 2 is a schematic cross-section through various layers of the pad, sensor and garment.

FIG. 2 shows the structure of the pad 2 in greater detail. The pad is sandwiched between an outer fabric layer 10 and an inner fabric layer 11. The pad consists of an impact absorbing layer 12. This may be made of a material such as foamed elastomers, thermoplastic elastomers, foamed thermoplastic elastomers or any suitable compliant material. This layer 12 will generally be less than 100 mm thick, more preferably less than 50 mm thick and most preferably less than 20 mm thick. Within the impact absorbing material 12 is an impact dissipating layer 13. This may be embedded in the impact absorbing material at the point of manufacture. Alternatively, the impact absorbing material 12 may be formed of two parts which are sandwiched around the impact dissipating layer 13. The impact dissipating layer 13 may be high impact engineering polymers (such as polycarbonate or nylon), glass or carbon fibre composites, bi-axial oriented films or any other material which provides high flexural strength, high puncture resistance and flexibility.

Figure 3A:
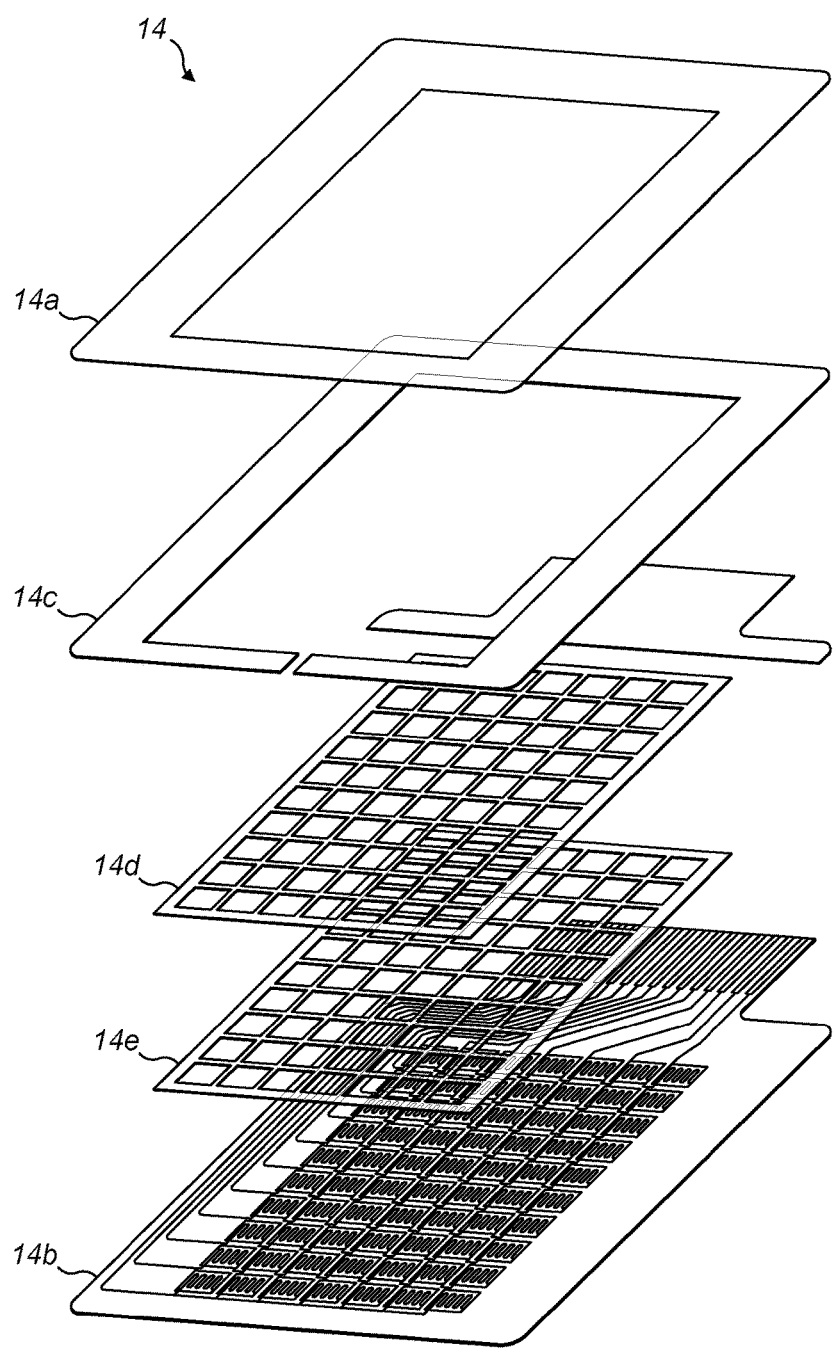
FIG. 3A is an exploded perspective view of a pressure sensor.
Figure 3B:
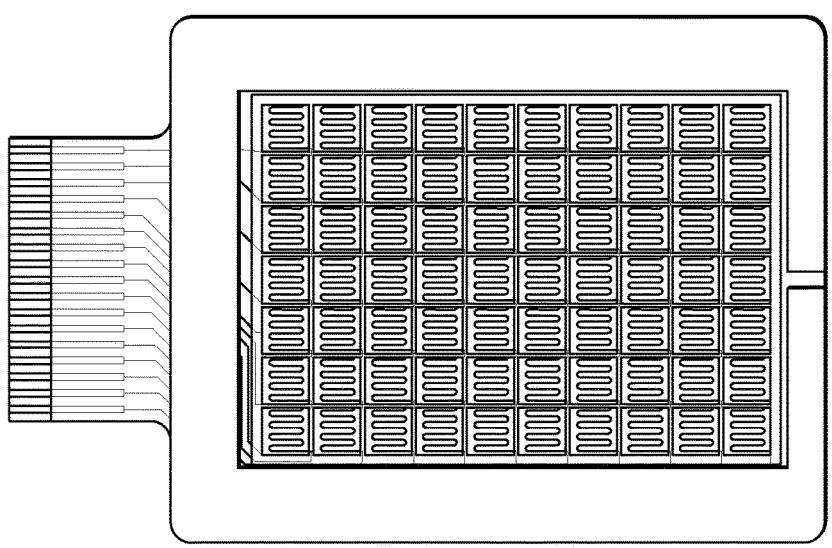
FIG. 3B is an assembled plan view of the same sensor.

Between the impact absorbing material 12 and the inner fabric layer 11 is a sensor 14. This sensor is shown in greater detail in FIGS. 3A and 3B. Another suitable sensor is shown in US2014/0083207.

The sensor 14 comprises two substrate layers 14a, 14b between which is provided a spacer layer 14c and, optionally, one or more dielectric layers 14d, 14e. The facing surfaces of the substrate layers 14a, 14b may carry conductive traces of known resistance printed thereon such that when contacting the substrate layers 14a, 14b provide a variable resistance that depends on the force of contact. Preferably, an array of such force sensing resistor elements is arranged in a grid pattern on the substrates 14a, 14b. The sensor can be designed in any desired pattern (the grid pattern does not have to be a regular pattern) with the effective sensing grid arranged within.

Figure 4:
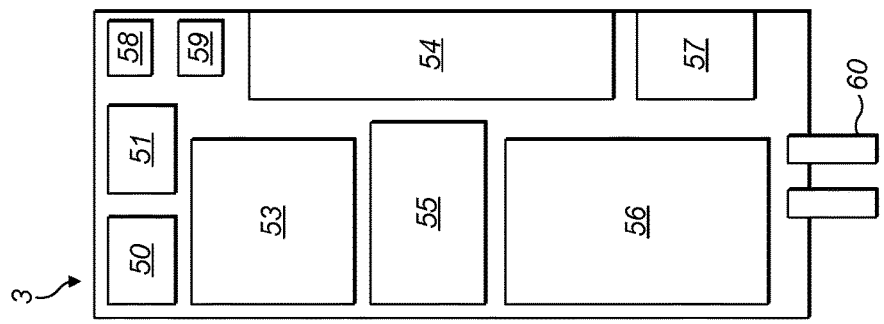
FIG. 4 shows the layout of the control module.

The layout of the control module 3 is shown in FIG. 4.

This module contains the following components.

An accelerometer (e.g. ADXL375) which is a three axis accelerometer. This will measure the acceleration of the wearer during normal motion as well as measuring an abrupt change upon impact.

A gyroscope 51 (e.g. ADXRS290). This is a dual axis gyroscope which is able to detect changes in orientation of the wearer.

A processor 53 (e.g. ARM Cortex M3) which will receive the readings from the pressure sensors 14 from the accelerometer 50 and gyroscope 51 and carry out various calculations and output diagnostic information as set out below.

A connector 54 to connect to the matrix sensor.

A power management integrated circuit 55.

A transceiver 56 such as a Bluetooth device.

A socket 57 via which a battery can be recharged.

An LED 58 which is preferably a multicolour device to provide an indication of device status such as on/off, low battery, charging or the like. It may also be used to provide visual output depending on the magnitude of the impact.

An on/off switch 59 for activating the device.

A battery connection 60 for attachment to a battery such as a lithium ceramic battery which provides a relatively large power source in relatively small volume. Although shown as a separate connection, the battery is preferably part of the control module 3.

Figure 5:
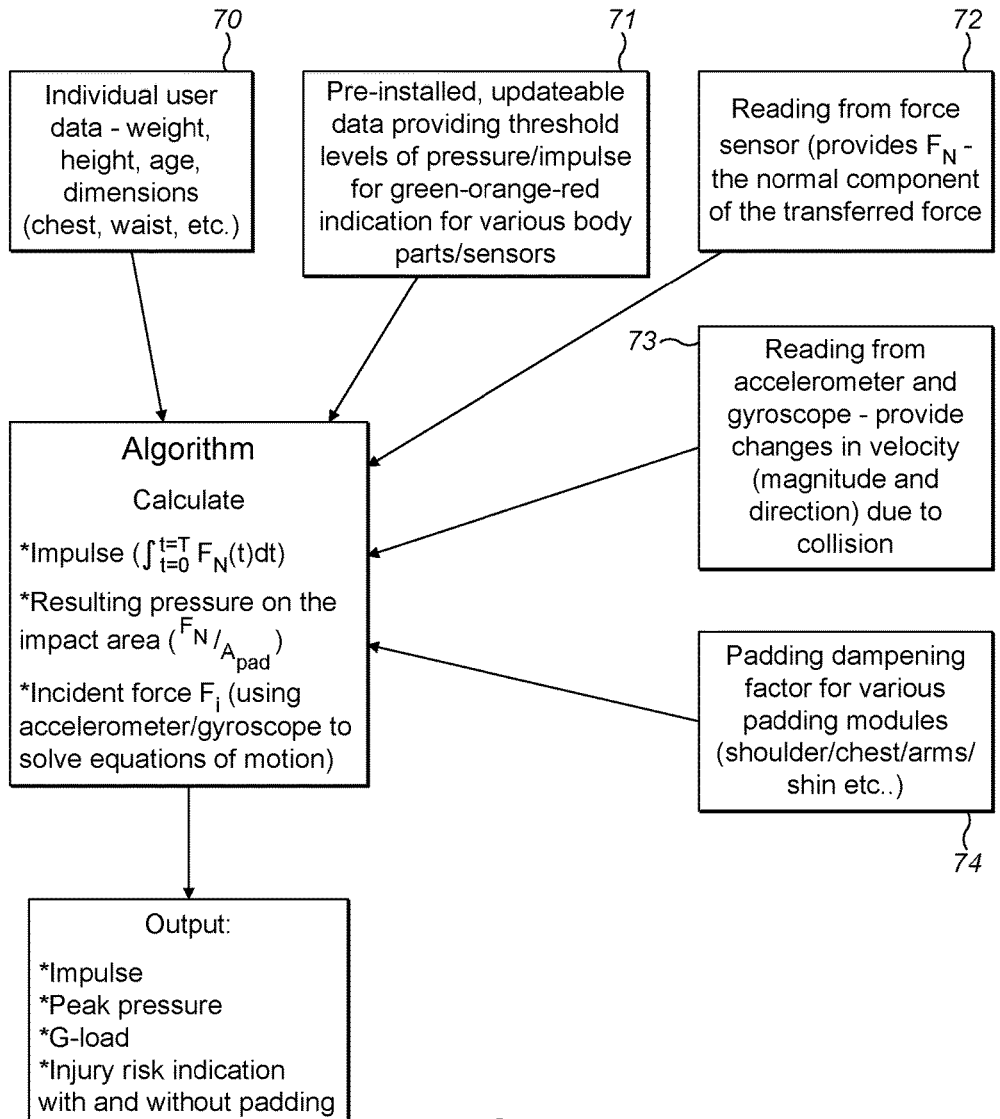
FIG. 5 is a flow chart showing the general operation of the system.

The operation of the present invention will now be described with reference to FIG. 5. The controller 53 receives a number of inputs as described below in order to assess the nature of an impact and to carry out various calculations and to provide useful output.

Certain information is provided by a user before first wearing the garment. This can conveniently be done by providing a user interface 70 such as an app or a website that a user can access when they first use the garment. Information is required on a number of parameters specific to the user such as their weight, height and dimensions such as chest and waist measurements. These are all used in determining the nature of the impact. There may also be an age input to allow the software to determine what might be considered to be an acceptable level of impact.

The software is pre-installed with data 71 concerning the threshold levels of peak pressure and impulse which are considered acceptable. These will include values for an individual impact as well as data concerning cumulative impact. Such values can be set based on existing medical research on safe levels of impact. This aspect of the software is updatable to allow for new information gathered from the latest medical research.

The input from the or each pressure sensor 14 is designated by numeral 72. The sensed value is the normal component of the transmitted force. The pressure sensor 14 provides an indication of the impact force $F_N$ as well as the area $A_{pad}$ over which this force has been applied.

The inputs from the accelerometer 50 and the gyroscope 51 are designated by numeral 73. The padding dampening factor 74 is programmed into the software based on the calibration of the material.

This may be as simple as applying an impact of a known magnitude to the pad and measuring the transmitted force. A more sophisticated calibration may be carried out by applying impacts of different magnitudes to the pad.

All of this information is then received by the processor 53 which can calculate the impulse felt by a user. This is achieved by integrated the force detected by the pressure sensor 14 over time.

Using this data, together with the individual user date, the accelerometer and gyroscope data as well as the padding dampening factor, the algorithm is able to calculate the incident force $F_i$ by solving the equations of motion using laws of momentum and energy conservation.

The output values can include the impulse and the peak pressure both as felt on the outside of the pad and as a peak pressure transmitted to the user, as well as an indication of the risk of injury and an indication of the effectiveness of the padding.

FIGS. 6A and 6B show a pad 2 in a tackle bag 80. As shown in FIG. 6B, the pad is positioned on one side of the bag and can be clearly marked so that it can be targeted by a user of the bag. The pad has the same structure as previously described that is able to absorb the force and measure the force downstream of the pad at the sensors 14.

Figure 7B:
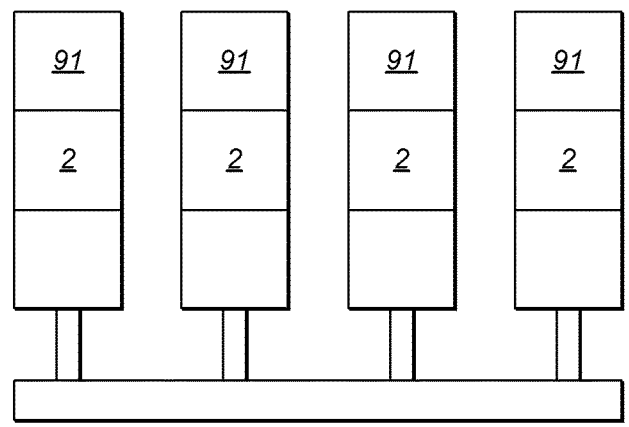
FIG. 7B is a front view of the scrummaging machine of FIG. 7A.

FIGS. 7A and 7B show the incorporation of four pads 2 into a scrummaging machine 90 which has four cushioned areas 91 as is well known in the art. Pads 2 are incorporated (one per cushion) into an area approximately at shoulder height to absorb and measure the impact.

Figure 8:
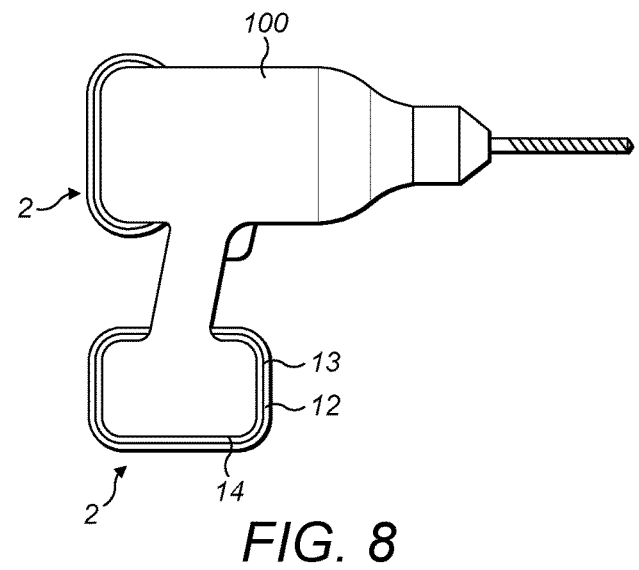
FIG. 8 is a schematic drawing of a drill incorporating a structure according to the present invention.

FIG. 8 shows the incorporation of two pads 2 into a drill 100 which is otherwise of a conventional structure. The pads are shown in the areas of the drill which are most vulnerable to being damaged by being dropped. However, the pads could be applied to other areas if necessary. Such pads may be useful, for example, if the tool or the work piece are particularly sensitive to damage as they can protect both the tool and the work piece from damage. They are also able to measure the impact force to which the tool has been subjected and provide an alert to a user should the tool need to be recalibrated or serviced. Whilst a drill had been illustrated in FIG. 8, it will be understood that this can be applied to any tool where the tool and/or work piece require protection.

Figure 9:
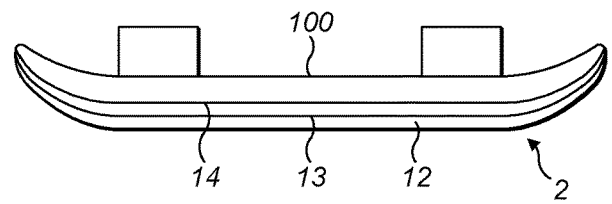
FIG. 9 is a plan view of a crash barrier incorporating the structure according to the present invention.

FIG. 9 shows a convention crash barrier 110 to which a pad 2 has been applied. The same layered structure allows the impact to be absorbed and dissipated and the sensors 14 will measure the force transmitted to the crash barrier which may be useful for accident investigation purposes and/or to determine whether the barrier requires maintenance.

The invention claimed is:

1. A combination of a structure to absorb, dissipate and measure a force, a means to calculate an impact force on the structure, and a control module, the structure comprising a plurality of distinct layers including:

a first impact absorbing material having an outer face facing the direction of expected impact and an opposite inner face;

an impact dissipating layer adjacent to the inner face of the first impact absorbing material and having a higher flexural rigidity than the first impact absorbing material;

a second impact absorbing material having an outer face adjacent to the impact dissipating layer and an opposite inner face, and having a lower hardness than the impact dissipating layer; and a pressure sensor arranged across the inner face of the second impact absorbing material, wherein an impact on the outer face of the first impact absorbing material is partially absorbed by that material, dissipated by the impact dissipating layer and further absorbed by the second impact absorbing material, with the remaining transmitted force being sensed by the pressure sensor;

the means to calculate the impact force on the structure comprising a means to calculate the impact force on the outer face of the first impact absorbing material based on the force measured by the pressure sensor; and the control module comprising an electrical connection to the pressure sensor and a processing unit to receive the sensed data and carry out any required calculation of the incident force and control the transmission of data as required, wherein the processing unit calculates a received impulse by integrating the detected force over time.

2. The combination according to claim 1, the structure further comprising an inner fabric layer covering the face of the pressure sensor on the opposite side of the pressure sensor from the second impact absorbing material.

3. The combination according to claim 1, the structure further comprising an outer fabric layer covering the outer face of the first impact absorbing material.

4. The combination according to claim 1, wherein the pressure sensor is in the form of a matrix array which is able to detect pressure changes across a substantial portion of the width of the structure.

5. The combination according to claim 1, wherein the first and second impact absorbing materials and impact dissipation layer together have a dampening factor of greater than 10%, preferably greater than 50%, most preferably greater than 85%.

6. The combination according to claim 5, wherein the means to calculate the impact force comprises a control system which is programmed with the dampening factor.

7. A combination according to claim 6, wherein the control module further comprises a transceiver which is able to transmit data wirelessly.

8. A combination according to claim 6, wherein the control module comprises a lithium ceramic battery.

* * * * *